United States Patent [19]
Schiller et al.

[11] Patent Number: 5,305,118
[45] Date of Patent: Apr. 19, 1994

[54] METHODS OF CONTROLLING DOT SIZE IN DIGITAL HALFTONING WITH MULTI-CELL THRESHOLD ARRAYS

[75] Inventors: Stephen N. Schiller, Menlo Park; Donald E. Knuth, Stanford, both of Calif.

[73] Assignee: Adobe Systems Incorporated, Mountain View, Calif.

[21] Appl. No.: 109,398

[22] Filed: Aug. 18, 1993

Related U.S. Application Data

[63] Continuation of Ser. No. 652,941, Feb. 8, 1991, abandoned.

[51] Int. Cl.$^5$ .............................................. H04N 1/40
[52] U.S. Cl. ................... 358/456; 358/455; 358/459
[58] Field of Search ............... 358/455, 456, 457, 459

[56] References Cited

U.S. PATENT DOCUMENTS

| | | | |
|---|---|---|---|
| 4,977,458 | 12/1990 | Granger et al. | 358/456 |
| 5,031,050 | 7/1991 | Chan | 358/457 |
| 5,111,302 | 5/1992 | Chan et al. | 358/459 |
| 5,124,803 | 6/1992 | Troxel | 358/459 |

Primary Examiner—Edward L. Coles, Sr.
Assistant Examiner—Thomas L. Stoll
Attorney, Agent, or Firm—Roger S. Borovoy

[57] ABSTRACT

A method of equalizing the shape and size of halftone dots in a supertile having digital cells, corresponding ideal cells and pixels to faithfully reproduce an image having predetermined gray levels. Various techniques include: (1) adding offset vectors to the coordinates of pixels in digital cells; (2) determining twice as many smaller digital cells as original digital cells; and (3) determining a model digital cell and ranking pixels in remaining digital cells to mimic the ranking of pixels in the model cell.

19 Claims, 4 Drawing Sheets

METHODS OF CONTROLLING DOT SIZE IN DIGITAL HALFTONING WITH MULTI-CELL THRESHOLD ARRAYS

This is a continuation of application Ser. No. 07/652,941, filed Feb. 8, 1991, now abandoned.

FIELD OF THE INVENTION

This invention relates to the creation of a threshold array that contains more than one halftone cell for the creation of halftone images. A threshold array that contains more than one halftone cell will cause apparent spots or bands in the image being reproduced unless measures are taken to equalize the sizes of halftone dots representing similar gray areas in the image.

BACKGROUND OF THE INVENTION

Continuous tone images do not print well on most printing devices, so the image is usually printed as pattern of dots based on a grid. The grid consists of an array of halftone cells, each of which represents one section of continuous tone in the original image. When reproducing a halftoned image in this way using a digital recording device, a halftone cell consists of a plurality of device pixels. A portion of display pixels of each halftone cell are turned black to form dots relatively larger or smaller to represent darker or lighter portions of the original continuous tone image. A dark halftone cell will have most of its pixels turned black while a light halftone cell will have most of its pixels turned white. A complete grid of the original image is composed of many such halftone cells, each of which has an independent density of displayed pixels and therefore a different apparent darkness when viewed from a distance.

A common prior art method of selecting which dots in each halftone cell to turn black works as follows: For a given half-tone cell, the original image is sampled at each display pixel location in said halftone cell to obtain a gray value. This gray value is represented digitally as a number in a fixed range, typically 0 to 255. The gray value is then compared to a threshold value in the same range and the display pixel is turned white if the image gray value is greater than the threshold value; otherwise it remains black. The threshold values, in turn, are supplied by means of a threshold array which contains a separate threshold value for each pixel in the halftone cell, and are computed prior to processing the image. This process is carried out for each halftone cell of the image.

This method works best when the same threshold array can be used for all halftone cells in the image. One advantage is that only one threshold array needs to be calculated and stored for the entire image. Another advantage is that a gray area of a given intensity will produce dots of the same size and shape no matter where it occurs in the image. However, in order for this to work, the set of display pixels corresponding to each halftone cell in the image must be exactly the same size and shape as the set of display pixels corresponding to any other halftone cell. This requirement is most often met by requiring the halftone cells to be parallelograms whose corners all fall exactly on integral coordinates in display pixel space. U.S. Pat. No. 4,185,304, incorporated herein by reference, shows one embodiment of this method.

One problem with the above method is that the number of different halftone screens that can be reproduced is limited by the requirement that the corners of the halftone cells must fall on integer coordinates in display pixel space. For example, the screens rotated through 15° or 75° commonly used in color printing cannot be accurately reproduced. This shortcoming is addressed in a first copending U.S. patent application Ser. No. 434,924, incorporated herein by reference, filed Nov. 8, 1989 by the same inventor and assigned to the same assignee as this invention (hereafter called the first copending application). Where it is shown how a threshold array that consists of multiple halftone cells can be used to increase the number of available halftone screens to the point where any arbitrary screen can be approximated to within adequate tolerances.

When the threshold array contains more than one ideal cell, it is desirable that this fact be invisible to the user. This means that all the halftone dots produced by one copy of the threshold array, for a given gray level, must be of the same size and equally spaced.

Unfortunately the multiple halftone cells in such a threshold array generally have to be of differing shapes and sizes when those halftone cells are represented by display pixels. This means that the dots produced by the different halftone cells may also be of different shapes and sizes even when they represent the same gray value. Depending on the degree of the differences in the size and shape of halftone dots, these differences may or may not be visible to the human eye. When they are visible, one sees a mottled variation in gray intensity in the form of repeating spots o; bands where the original image contained only a constant gray. Such patterns do not faithfully reproduce the original image and are thus undesirable.

The following terms are defined for clarity. An ideal halftone cell, or ideal cell for short, will be a halftone cell such as the ones discussed above: an element of the halftone grid consisting of an area bounded by a rotated square or a parallelogram. In contrast, a digital halftone cell, or digital cell for short, will be a set of pixels used to approximate an ideal halftone cell. Thus each digital halftone cell is associated with a specific ideal halftone cell that it approximates. Also, in keeping with the above-mentioned copending U.S. patent application Ser. No. 434,924, incorporated herein by reference, a threshold array that consists of multiple halftone cells will be referred to as a "supertile".

In the prior art method of generating a supertile as disclosed in the copending application a digital halftone cell consists of all the pixels in the supertile whose geometric centers fall within the associated ideal cell. This method creates digital halftone cells of satisfactory consistency for certain halftone screens, but for other screens, an unsatisfactory variation in digital cell size results. These variations occur because, although each ideal cell has the same shape, its placement with respect to the pixel grid varies by fractional amounts of pixels. Thereby, in some cases, more pixel centers fall inside an ideal cell and in other cases fewer pixels centers fall inside an ideal cell. The resulting variations in the size of the digital halftone cells causes corresponding variations in the size of halftone dots when certain values of gray are reproduced. This is called the unequal cell size problem, addressed in a second copending U.S. patent application Ser. No. 07/652,927, filed Feb. 8, 1991, by the same inventor and assigned to the same assignee as this invention, incorporated herein by reference.

Figure 1:
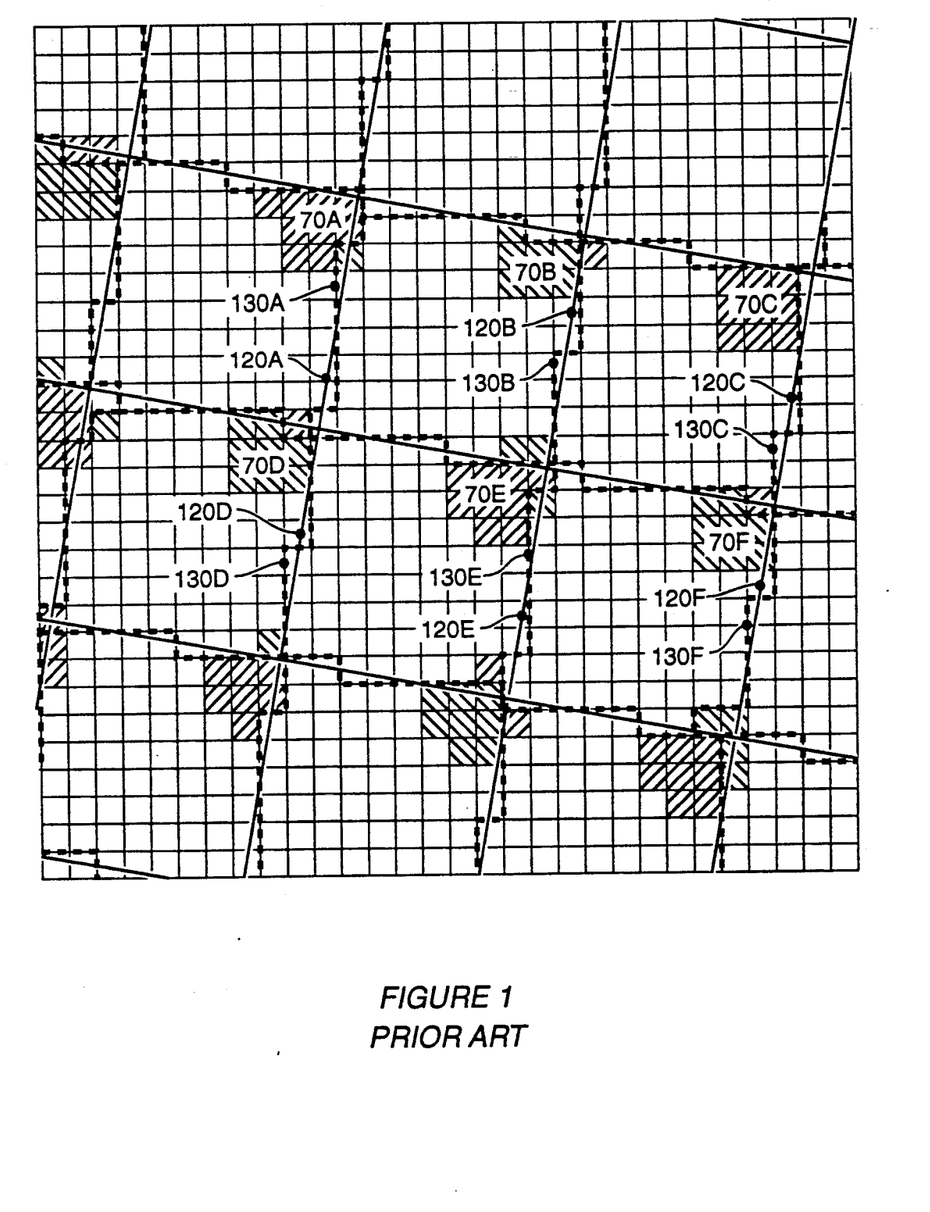
FIG. 1 illustrates a display system of the prior art, wherein dots are displayed with incorrect number of pixels.

Another type of error is caused at certain gray levels where a given black or white halftone dot crosses the boundaries of its digital halftone cell and overlaps pixels on neighboring digital cells. A single black or white halftone dot might be split into two or more pieces, each piece residing in a separate digital halftone cell, as shown in FIG. 1. Because a digital halftone cell 130A-F may be asymmetric relative to the corresponding ideal halftone cell 120A-F, the various pieces of a halftone dot 70A-F in an ideal cell 120A-F may also get pixels allocated asymmetrically. When the digital halftone cells 130A-F are put together and whole halftone dots 70A-F are formed, the pieces that are used to form a given halftone dot may be too small or too large relative to a predetermined expected size even though the correct total halftone dot pixels within each digital cell.

For example each of the digital cells 130A-F of FIG. 1 are assigned ten black pixels (shown cross hatched); the remaining pixels are white. The black pixels create dots 70A-F. Dot 70A is the correct predetermined size. It includes ten black pixels, nine pixels are primarily within digital cell 130A and one is primarily in digital cell 130B. However, dot 70B includes only eight black pixels, one of which is primarily in digital cell 130C. Dot 70E includes twelve black pixels of which nine are primarily in cell 130E, two are primarily in digital cell 130B and one is primarily in digital cell 130F. This problem is called the multi-cell dot (MCD) problem. It is a principal object of this invention to correct the above multi-cell dot problem.

SUMMARY OF THE INVENTION

The method of this invention can be practiced using any of several hardware devices which may include a scanner, a computer and some type of raster display device. An original image is mechanically or electronically scanned, calculated, manipulated or otherwise prepared for reproduction. When a very accurate representation of a halftone screen requires that a threshold array be used containing multiple digital halftone cells of slightly differing shapes, this invention ensures that each halftone cell is printed or displayed in a manner to balance the number of pixels. This is accomplished by a combination of the use of smaller pixels and the requirement that any halftone dot made up of a portion of these pixels which lies in two or more digital cells does not gain or lose pixels to adjacent digital halftone cells. This ensures that all halftone dots representing a given gray level are as nearly equal in size as possible.

The first technique of the invention corrects lopsidedness that is caused, for example, when generic pixels are added to one side of the digital cell and taken away from the other side. This lopsidedness can cause generic pixels to be distributed unevenly when the halftone dot is divided between digital cells. This lopsidedness is reduced when the center of gravity of each digital cell is used as the origin relative to which the generic pixel coordinates are transferred into ideal cell space coordinates for the spot function to take place.

According to the second technique of the invention, the MCD problem is reduced when each ideal halftone cell is split into two equal parts, a white part and a black part, when building the threshold array. This second technique is restricted to certain spot functions, normally those giving rise to a perfect checkerboard pattern rotated 45° with respect to the original halftone grid when a 50% gray level is requested.

The third technique of the invention offsets the spot function by the vector $(\frac{1}{2}, \frac{1}{2})$ in cell space relative to all halftone cells, which further reduces the MCD problem. By doing so, neither black nor white dots are centered exactly at the four corner areas of any ideal cell. However, at certain gray levels, when the black and white dots first cross the edge of the selected ideal halftone cell, dot sizes can vary due to varying contributions from different digital cells. However, because the dots already have a large number of generic pixels in them, these variations are not as noticeable as before.

The fourth technique of this invention creates a data structure that includes information in the form of lists of pixels representing how a halftone dot may be split by a digital cell at various gray levels. Thereafter, the pixels in a selected cell are ranked in a way that models the loss or the gain of pixels relative to a predetermined model cell.

Halftoning systems currently in the market allow a limited number of spot functions and are specially optimized to work with a fixed set of built in spot functions. The techniques of the present invention produce high quality halftoning with a wider range of spot functions than was previously possible.

BRIEF DESCRIPTION OF THE DRAWINGS

A complete understanding of the present invention and other advantages and features thereof may be gained from a consideration of the following description of the preferred techniques taken in conjunction with the accompanying drawings in which.

DETAILED DESCRIPTION OF THE PREFERRED EMBODIMENT

The techniques will be explained in terms of their implementation as computer programs running on a digital computer. Whenever the implementation of some part of the techniques might not be clear to one skilled in the art, explicit computer source code will be provided in the C programming language. A reference for the C-language is *The C Programming Language*, by Brian W. Kerninghan and Dennis M. Ritchie, published by Prentice-Hall Inc., incorporated herein by reference. Mathematical expressions in the C-language are similar to usual mathematical notation. The "*" symbol is used to denote multiplication. Comments in the source code are delimited by "/*" and "*/".

The implementation of the invention as a computer program requires that certain mathematical functions be available to the program as subroutines. These functions are defined in the next section.

Mathematical Functions Used in The Invention

Floor(x) is the greatest integer smaller than or equal to the floating point value x.

Ceil(x) is the smallest integer larger than or equal to the floating point number x.

Sqrt(x) is the positive square root of x.

Terminology

In the following specification and drawings, references are made to the terms which are defined here as:

Device Space: An area of a two-dimensional plane in which the recording device can make black marks on a white background, or vice versa.

Device Pixel: The recording device can only mark certain discrete areas in device space. Each such area is a device pixel or a generic pixel.

Device Coordinates: A coordinate system used to describe the locations of device pixels. The device pixels of any device can be assumed to reside in a rectangular array. The pixel coordinates (x,y) refers to the pixel in the y-th row and the x-th column. The origin of the device coordinate system is labeled 00 in FIG. 3. To avoid ambiguity, a device pixel at location (x,y) will be assumed to be the pixel that covers the area of a square whose corners are given by (x,y), (x+1,y), (x+1,y+1), (x,y+1), where x and y are integers. Most marking devices are not this precise but the above convention will be useful in explaining the processes described below.

Halftone Grid: A grid of squares, larger than the device pixels and generally rotated with respect to the device coordinate system. This grid controls the placement of halftone dots. In an analog system halftone dots are circles centered exactly in the middle of squares in the halftone grid. The techniques of the invention described below will also work if the halftone grid is a made up of parallelograms instead of squares.

Ideal Halftone Cell: A single square in the halftone grid.

Ideal Cell Space or Cell Space: a coordinate system based on a selected ideal cell. Such a coordinate system will have its origin in the center of the ideal cell and will be further scaled so that the corners of the ideal cell have coordinates (1,1), (1, −1), (−1, −1), (−1, 1). The technique of conversion between such a coordinate system and the device coordinate system will be obvious to those skilled in the art. (Reference: *Fundamentals of Computer Graphics*, by Foley and Van Dam, chapter 7, incorporated herein by reference.) Note that there is a different cell space coordinate system for each different ideal cell.

Digital Halftone Cell or Digital Cell: A group of generic pixels that approximates in shape and size an associated ideal cell. Since the sides of an ideal cell do not in general coincide with the boundaries of pixels, a digital cell can only approximate an ideal cell to within one generic pixel in accuracy. A particular digital cell is "associated" with an ideal cell, or vice versa, if the ideal cell is the one approximated by the digital cell.

Halftone Dot: For a given gray level, a contiguous set of generic pixels turned black (or white for a white dot) that is perceived by the human eye as a black (or white) dot in the pattern of dots comprising a halftoned image. Note that this definition is made in terms of human perception. Therefore this term will only be used in describing desired or actual properties of certain halftoning techniques, not to define how such techniques are carried out.

Black (or white) Cell Dot: The set of black (or white) generic pixels in a digital cell that are turned black (or white) at a given gray level. The term cell dot by itself may be used where a black or white cell dot is meant. Note that the term cell dot has a rigorous definition, as opposed to the halftone dot. But the pixels comprising a cell dot may not be the pixels that the human eye perceives as a halftone dot. For example, in FIG. 2, the black cell dot of digital cell. 130 is made up of separate pieces: 80A, 80B, 80C and 80D. As another example, in FIG. 1, the digital cell 130A has a black cell dot that includes nine black generic pixels in halftone dot 70A and one black generic pixel proximity in halftone dot 70D. The human eye would not see this group of two pixel as a single dot.

Black (or white) Dot Piece: The various contiguous pieces into which a black (or white) cell dot is divided. For example, in FIG. 2, the black cell dot of digital cell 130 includes three black generic pixels in dot piece 80A, one black generic pixel in dot piece 80B, and three black generic pixels in dot piece 80C and one black generic pixel dot piece 80D.

Supertile 140 (FIG. 3): For a given halftone grid 220, the first copending application, shows how to construct supertile 140. Supertile 140 is a set of device pixels 110 with the following properties: (1) The supertile 140 can be replicated by translation to cover each generic pixel 110 in device space exactly once; (2) If the screen grid (in this application halftone grid 220) is superimposed on supertile 140, it divides it up into an integral number of ideal halftone cells 120. Some of these ideal cells 120 may be split into pieces by the boundary of the supertile 140; and (3) When supertiles 140 are assembled by tiling, any split pieces of halftone cells at the edges of a supertile are reassembled, as shown in FIG. 3.

Figure 3:
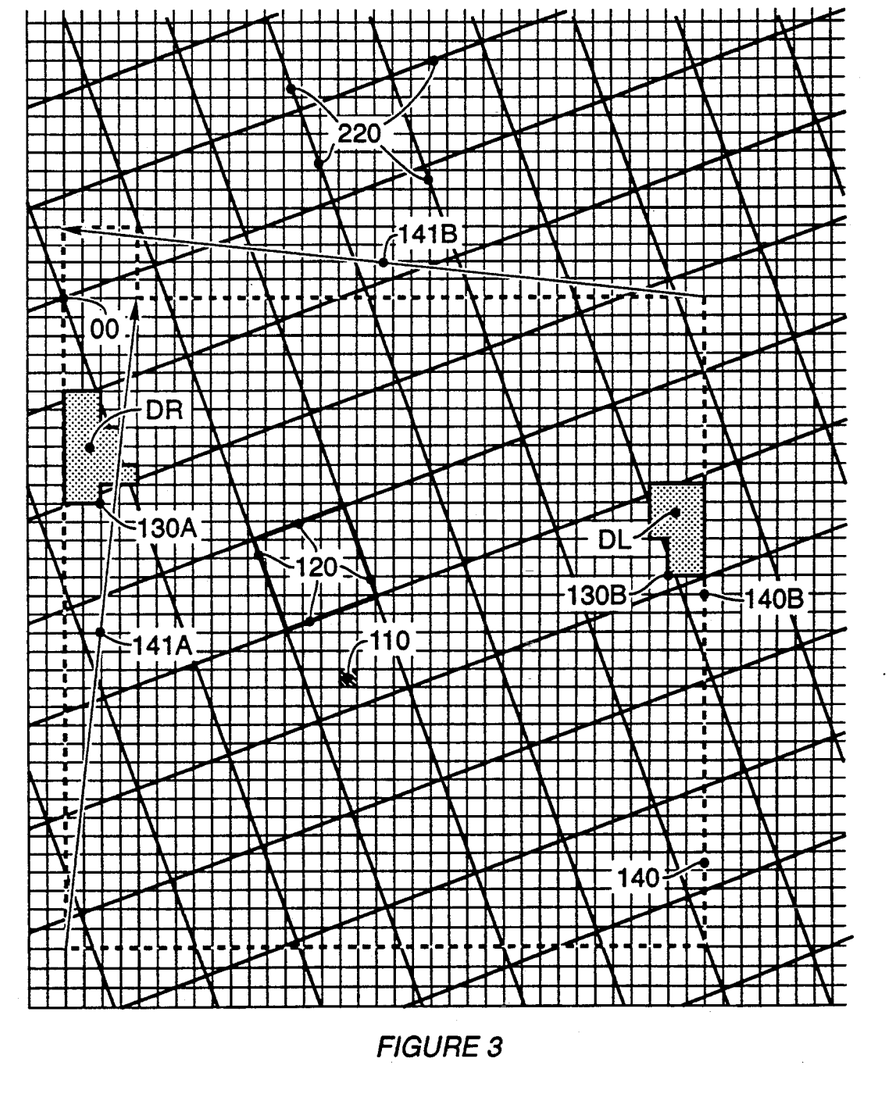
FIG. 3 illustrates relationship of one supertile to the ideal halftone cells contained in it to other supertiles.

For the purposes of this disclosure, a particular supertile with dimensions "sx" and "sy" is constructed as shown in FIG. 3. These dimensions indicate that the supertile consists of pixels in an sx-by-sx square whose lower left corner coincides with the origin 00 in device coordinates along with the pixels in an sy-by-sy square whose upper left corner coincides with the origin in device coordinates 00. Thus a generic pixel, having device coordinates (x, y) in the sx-by-sx square will have both x and y greater than or equal to 0 and less than or equal to sx-1. Such a pixel in the sy-by-sy square will have x greater than or equal to 0 and less than or equal to sy- 1, and would have a y less than 0 and greater than or equal to −sy.

Supertile Translation Vectors 141A and 141B: As mentioned above, the supertile can be translated to cover device space. Any such translation of the supertile can be accomplished via successive translations using the two supertile translation vectors. The two vectors have values (sx,sy) for vector 141A and (−sy,sx) for vector 141B, respectively, in device coordinates as shown in FIG. 3.

Equivalent Cells: Any two ideal cells, called c1 and c2, are said to be equivalent if one cell can exactly be superimposed on the other through a succession of translations by the two supertile vectors. Another way of understanding this is by taking one supertile and labeling all the ideal cells within that supertile uniquely. By tiling all space with that supertile, the ideal cells produced by this tiling will be exactly equivalent when they have the same label.

Threshold Array (FIG. 3): A term used commonly in halftoning to denote a set of generic or device pixels 110 that tile the plane (i.e. condition number 1 under the definition of supertile 140) wherein each generic pixel 110 is given a "threshold value". Such threshold arrays are used to generate halftoned images in the following way: First, the plane is tiled with the threshold array.

Thus, each generic pixel 110 is covered by a copy of the threshold array so that it can be associated with the threshold value of the generic pixel 110 covering it in this copy of the threshold array. Next the desired gray value for the generic pixel 110 is computed from the image being halftoned, and compared to the threshold value. If the gray level is greater than the threshold value, the generic pixel 110 is left white; otherwise it is marked black.

Supertile 140 mentioned above is calculated in order to define the set of pixels comprising the threshold array in the present invention. Since a supertile encompasses multiple ideal cells, so will the threshold array.

Spot Function: In the actual implementation of digital halftoning, a digital cell is selected and then all pixels that lie in that digital cell are put into a list. A spot function is then called for each pixel in the list. The cell space coordinates of the pixel are inputted into this spot function and it returns a value that is used to rank that pixel relative to the other pixels.

This ranking determines the order in which pixels change from black to white in the ideal cell as the desired gray level changes from darker values to lighter values. Thus the ranking is used to determine the threshold values in the threshold array (supertile). In this way the spot function is used to control the shape of the halftone dots at various gray levels.

When the coordinates of a pixel are passed to the spot function, the coordinates are transformed to a the cell space for the ideal cell being processed.

Still referring to FIG. 3, the following techniques are applied after the number of generic pixels 110 assigned for each ideal cell 120 is known to be equal, as illustrated by the various techniques of the second copending application. The first three techniques alter how the spot function is called in the process of creating a digital halftone. This in turn alters the values in the threshold array when it is created by the techniques explained above. The fourth technique does extensive processing on the values returned by the spot function, which are then used to create the threshold array. The output of the invention is an altered threshold array, based on a supertile, which may then be used to create halftoned images free of spurious gray bands or spots.

The Spot Offset Correction Scheme

The first technique of correcting patterns caused by the multi cell dot MCD problem deals with modifying how the spot function is called for each ideal cell 120.

Still referring to FIG. 3, in assigning generic pixel 110 to ideal cells 120, digital cells 130 are created that only approximate the shape of the ideal cell 120. For example, a surplus of generic pixels 110 may be added to one side of the digital cell so as to leave it lopsided relative to the shape of the associated ideal cell 120. This lopsidedness can cause generic pixels 110 to be distributed unevenly when the halftone dot is divided between digital cells 130A-F shown in FIG. 2. The following technique, described with reference to FIGS. 1 and 2 reduces these effects. This technique is used in the same way for each digital cell in the supertile. Thus it will be explained only in reference to an arbitrary selected digital cell of the supertile. The following information is available: a list of generic pixels in the digital cell; and the coordinates of the center of the corresponding ideal halftone cell in device space coordinates, denoted (cx, cy).

The center of gravity of the selected digital cell 130 is computed as described below from the generic pixels 110 that were actually assigned to it. Then the center of gravity (gx, gy) is subtracted from the geometric center of the ideal cell (cx, cy) to produce an offset vector (fx, fy). This offset vector (fx, fy) is added to the coordinates of generic pixels 110 in device space before transforming the coordinates into cell space coordinates for the spot function. This can be summarized as follows:

$$fx = cx - gx;$$

$$fy = cy - gy;$$

Then for each generic pixel coordinate (x, y):

$$x = x + fx;$$

$$y = y + fy;$$

Figure 2:
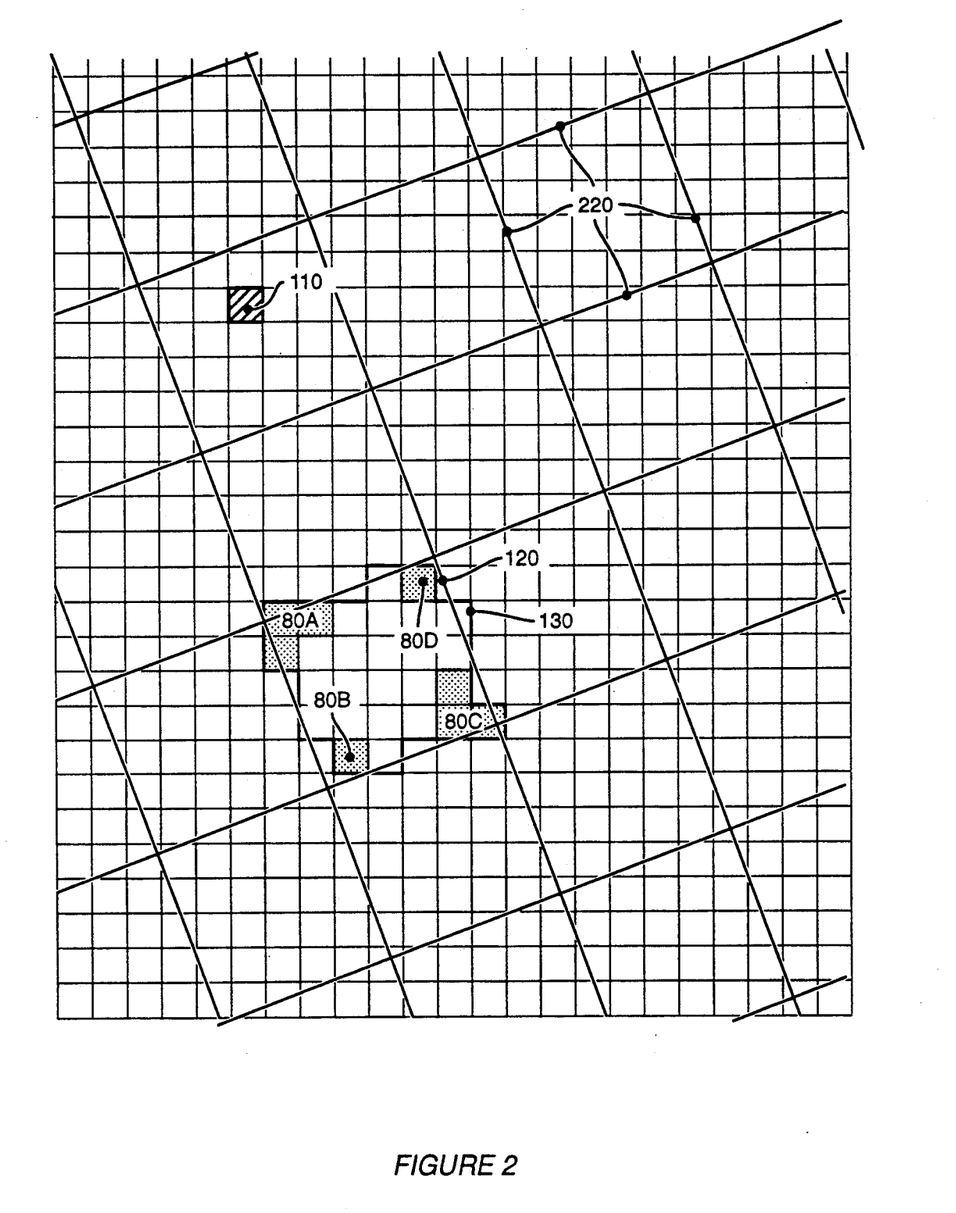
FIG. 2 illustrates the relationship of an ideal cell to its associated digital cell and the relationship of a cell dot to the digital cell containing it.

The center of gravity is computed by taking the device coordinates (x,y) of each generic pixel 110 in the digital cell 130, converting those coordinates to cell space coordinates (u,v) and averaging the resulting u and v coordinate values separately to obtained an averaged uncoordinate and an averaged v-coordinate. However, a digital cell 130A-F may be divided into pieces by an arbitrary supertile 140 shown in FIG. 3. For example digital cell 130B is divided by arbitrary boundary 140B of supertile 140 into two pieces DR and DL. If this occurs, the averaging of coordinates will not execute correctly.

The following steps are taken to prevent this. If any generic pixel in the digital cell with device coordinates (x,y) is at a distance d from the center of the ideal halftone cell (cx, cy), where d is greater than a predetermined distance equal to the length of one side of an ideal cell, then the generic pixel coordinates (x, y) are translated by the supertile translation vectors until the generic pixel coordinates (x, y) are within the predetermined distance of the coordinates (cx, cy). The translated coordinates are then used in the averaging process instead of the original generic pixel coordinates.

The sequence of supertile vector translations used in the above process can be calculated directly. Note that the order of translations does not matter, only the number of times each of the two supertile translation vectors are used. Let n1 denote the number of times supertile translation vector 141A with the value (sx, sy) is used, and let n2 denote the number of times supertile translation vector 141B with the value (-sy, sx) is used. Either n1 or n2 may be negative to indicate that the corresponding supertile translation vector is negated when used for translating. The following C-language code segment 1a computes n1 and n2, where x and y are the device coordinates of a generic pixel for which the translation is being computed:

```
/* Code segment 1a */
int x1, x2; /* Declare temporary variables */
x1 = x - cx + sx/2 - sy/2;
y1 = y - cy + sy/2 + sx/2;
n1 = -Floor((x1*sx - y1*sy)/(sx*sx + sy*sy));
n2 = -Floor((x1*sy + y1*sx)/(sx*sx + sy*sy));
```

The actual translation of (x, y) is then computed by code segment 1b to be:

```
/* Code segment 1b */
```

```
-continued
x = x + n1*sx — n2*sy;
y = y + n1*sy + n2*sx;
```

After this is done, the x and y coordinates are converted to cell space coordinates (u, v) and passed to the spot function.

In the above technique the coordinates passed to the spot function were offset by an amount calculated from the locations of the various generic pixels in the selected digital cell. Such offsets can be calculated in other ways. For example, a random number generator could be used to provide such offsets. This can be useful where it is intended to obscure a regular pattern of lopsidedness in the allocation of generic pixels to digital cells with a random pattern.

The Split Cell Correction Scheme

The second technique of correcting patterns caused by the multi cell dot MCD problem will now be described. This technique came about because the spot offset scheme does not always work. Because the spot offset scheme only reduces the variation in halftone dot size, it does not guarantee that halftone dot sizes will vary less than a predetermined level. The second technique can assure nearly equal halftone dot sizes for certain kinds of spot functions.

Referring to FIG. 3 according to this technique, each ideal cell 120 is split into two equal parts when building the threshold array of this invention, which is supertile 140.

Figure 4:
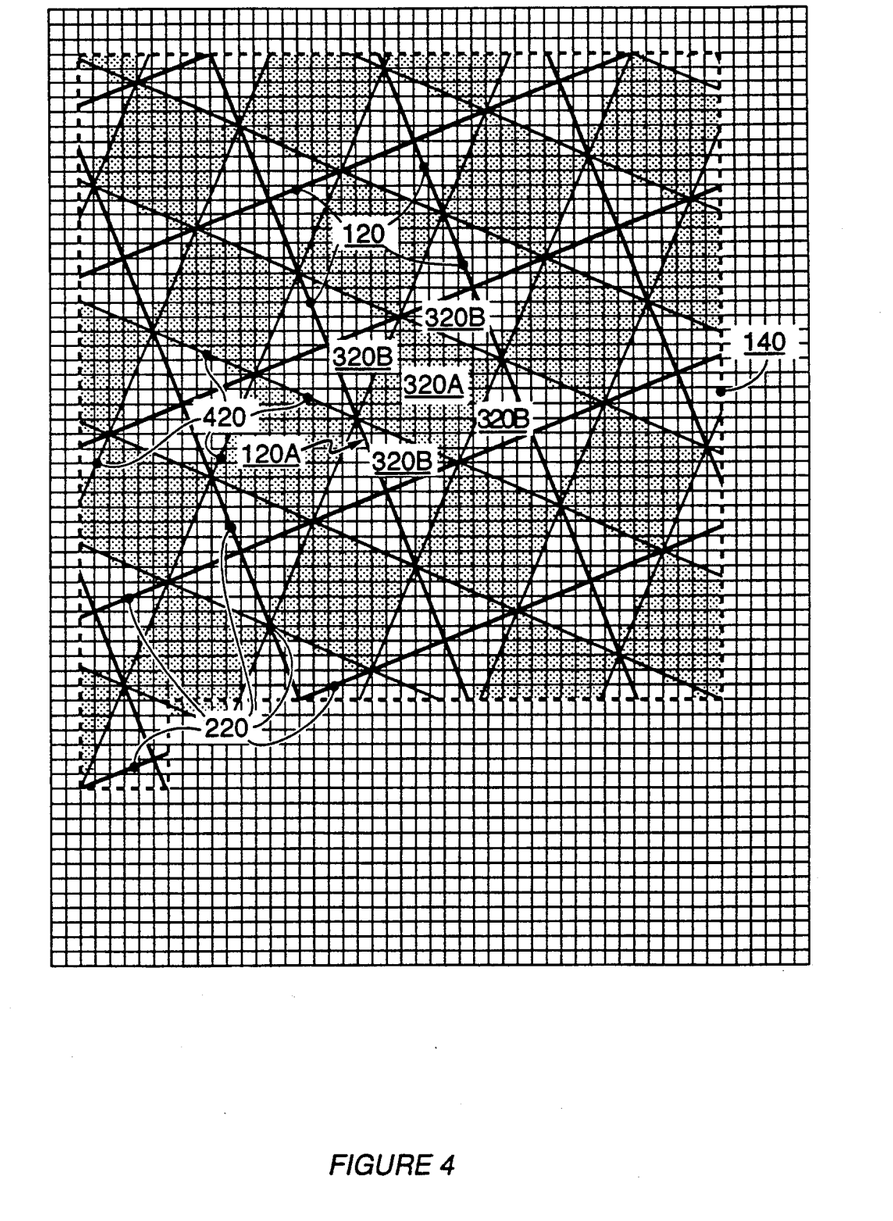
FIG. 4 illustrates a checkerboard pattern of digital cells produced by two halftone grids.

The second technique works best with certain spot functions, such as those that give rise to a perfect checkerboard pattern rotated 45° with respect to halftone grid 220 when a 50% gray level is requested, as shown in FIG. 4. This includes the most common spot function, the one used to simulate optical screening. (Reference: *The PostScript Language Reference Manual*, by Adobe Systems Incorporated, p. 315, incorporated herein by reference).

The first step of this second technique is to create a second ideal halftone grid 420 based on the checkerboard pattern of the 50% gray level from a first ideal halftone grid 220. Thereafter the generic pixels are assigned to ideal cells 320A or 320B of the second grid 420, preferably using the equal area method disclosed in the second copending application.

This second checkerboard pattern produces an ideal grid 420 computed by rotating the first ideal grid 220 by a 45° angle and scaling down the side of an ideal cell 120 of the first ideal grid 220 by 1/Sqrt(2) and aligning the second ideal grid 420 so that the corners of the second ideal grid 420 fall at the midpoints of the sides of the ideal cells 120 in the first ideal grid 220. There will be exactly twice as many ideal cells 320A or 320B of the second ideal grid 420 in the same size supertile 140 as there were in the first ideal grid 220. Keeping the original dimensions of supertile 140 in combination with the finer second halftone grid 420 results in halftone pseudo-cells 320A and 320B. An equal area method, for example, may be used to insure that each pseudo-cell 320 is assigned the same number of pixels.

Finally the spot function is called and threshold values are computed. Supertile 140 is made to look as if it was created with the first ideal halftone grid 220. This is done by noting that each ideal cell 320A and 320B of the second grid 420 is either "even" numbered or "odd" numbered, depending on whether the coordinates of the lower left corner of ideal cell 320, when represented in a coordinate system based on the second ideal grid 420, sum to an even or to an odd number.

For an even numbered ideal cell 320, the technique of transformation will be illustrated with respect to a selected even numbered ideal cell 320A. The coordinates passed to the spot function are transformed to be in that part of ideal cell 120A of the first ideal grid 220 that would contribute to the black part of the checkerboard pattern of the second ideal grid 420, as shown in the C-language code segment 2a that follows.

```
/* Code segment 2a */
X = (x + y)/2;
Y = (x — y)/2;
```

Capital X and Y are coordinates in the cell space of ideal cell 120A; small x and y are coordinates in the cell space of ideal cell 320A.

After these values have been passed to the spot function and sorted, they are assigned threshold values in the range of 0 to 127 instead of the usual range of 0 to 255. This is because the values from ideal cell 320A are supplying only half of the total thresholds in ideal cell 120A.

For an odd-numbered ideal cell 320B, shown broken into four pieces so as to lie within ideal cell 120A, the process is similar except that the transformation back into the coordinates of the original first ideal grid 220 is shown in the C-language code segment 2b that follows.

```
/* Code segment 2b */
X = (x + y)/2 + 1;
if (X > 1) X = X — 2;
Y = (x — y)/2 + 1;
if (Y > 1) Y = Y — 2;
```

Threshold values are assigned in the range 128 to 255.

Now both white and black dots are completely enclosed within one ideal cell 120 of the original first halftone grid 220. This means that the size of the black and white checkerboard dots closely follows the size of ideal cell 120 of the first grid 220. There is very little variation in sizes of these dots.

If the spot function is not one that produces a checkerboard pattern at 50% gray, then the following two techniques are used to reduce the variation in spot sizes.

Third Technique of Correcting the MCD Problem

The third technique of correcting patterns caused by the MCD problem will now be described. Some spot functions have a minimum or maximum value, where the four corners of ideal cells meet, thus causing black or white halftone dots to be centered where four ideal halftone cells meet. When a halftone dot is split into four pieces in this way, as opposed to two or three pieces, the MCD problem becomes worse.

Another problem with such a spot function is that the splitting of a halftone dot occurs when the halftone dot is very small. Thus an error of a few pixels in size is large relative to the total size of the halftone dot. Experience shows that in these cases, the errors are more visible to the human eye.

Therefore it is the purpose of this third technique to reduce the problems caused by such spot functions by altering the execution of the spot function.

As before the coordinates of generic pixels in a digital cell are converted to the cell space coordinates (x, y) for the corresponding ideal cell. Next the following C-language code segment 3 is used to modify x and y before x and y are passed to the spot function:

```
/* code segment 3 */
x = x + 1/2;
y = y + 1/2;
if (x > 1) x = x - 2;
if (y > 1) y = y - 2;
```

This transformation of the x and y coordinates moves the minimum or maximum of the spot function away from the four-corners area of the ideal cell grid and toward the interior of an ideal cell. The resulting halftone dots will still cross ideal cell boundaries for certain gray levels, but they will be larger when they do so, thus making relative errors not so noticeable. The halftone dots in FIG. 1 have been offset in such a fashion.

In code segment 3 above the pixel coordinates are offset by adding the vector (½, ½). Any such vector may be used to some advantage if after adding the vector to the coordinates of the pixel, the coordinates of the pixel are then brought back into the range of coordinates that include the ideal cell. If the coordinates in an ideal cell are in the range from A to B, then the repeated addition or subtraction of the value B-A to each pixel coordinate is used to bring that coordinate into the range from A to B. In the example in code segment 3, A is equal to $-1$ and B is equal to 1, then the value $2=1-(-1)$ is subtracted if necessary to bring the pixel coordinates, x and y, into the range from $-1$ to 1.

The Fourth Technique of Correcting the MCD Problem

The fourth technique of correcting patterns caused by the MCD problem will now be described with reference to FIG. 3. Referring to FIG. 2, this technique ensures nearly constant dot size when used after assigning equal, or nearly equal, numbers of generic pixels 110 to each ideal cell 120. Unlike the split cell technique this fourth technique can be used with almost any spot function.

As with the spot offset scheme this technique must be modified if the boundaries 140B (FIG. 3) of the supertile 140 divide digital cell 130B. Here also, when processing a digital cell that is split by the supertile, the translation code of code segments 1a and 1b is used to bring all of the generic pixels in a given digital cell into a set of contiguous pixel locations. It is assumed that this operation is performed on all such pixel coordinates when they are represented in computer memory prior to the operation of the following technique. The technique starts by selecting a "mode", digital cell from among the plurality of digital cells in the supertile. The model cell may be chosen by any of variety of techniques, including but not limited to a selecting predetermined digital cell, selecting a random digital cell or selecting a model digital cell based upon the pixels included in the digital cells, the location of the corresponding ideal cell and any other useful information.

For the purposes of this explanation, a predetermined digital cell whose corresponding ideal cell has a corner with device coordinates (0,0) is chosen to be the model digital cell. The remainder of the technique will be best explained below in reference to the listing of a computer source code segment 4 written in the C-language and which includes several code references.

```
/* Technique Four: C-language source code segment 4 */
#define EMPTY 0
/* Declaration of data structures. */
typedef long int ListInfo;
/* Code reference 4.1. */
 /* Definition of a generic entry in a list. */
typedef struct__GenericList {
     struct__GenericList *next, *previous;
     ListInfo element;     /* Points to data for a list element. */
} GenericList;
/* Code reference 4.2 */
/* One type of list points to these structures, which
    represent pixels in the digital cell. */
typedef struct __PixelElement {
     float x, y;
     spotValue sv;
     int flag;
     int oldRank, newRank;
     } PixelElement;
/* Code reference 4.3 */
/* Definition of various list-manipulation procedures. */
/* Allocates a new PixelElement element. */
PixelElement *NewPixelElement(old)
PixelElement *old;
{
     PixelElement *new;
     new = (PixelElement *) malloc(sizeof(PixelElement));
     *new = *old;   /* Copy contents of old. */
     return new;
}
GenericList *NewListElement( ) {
     GenericList *new;
     new = (GenericList *) malloc(sizeof(GenericList));
     new→next = EMPTY;
     new→previous = EMPTY;
     new→element = EMPTY;
     return new;
}
int CountElements(list)
GenericList *list;
{
    int count = 0;
    while (list != EMPTY) {
       count = count + 1;
       list = list→next;
    }
    return count;
}
/* Obtains a pointer the element at the tail of a list. */
GenericList *TailOfList(list)
GenericList *list;
{
     GenericList *tail = list;
     while (tail→next != EMPTY) tail = tail→next;
     return tail;
}
/* Adds an element to the tail of the list. */
GenericList *AddToList(list, element)
GenericList *list;
ListInfo element;
{
     GenericList *new = NewListElement();
     GenericList *tail;
     new→element = element;
     if (list == EMPTY) return new;
     tail = TailOfList(list);
     new→previous = tail;
     tail→next = new;
     return list;
}
/* Removes the element at the head of the list and returns it. */
GenericList *RemoveHead(list)
GenericList **list;
{
     GenericList *l = *list;
     *list = l→next;
     l→next = EMPTY;
     (*list)→previous = EMPTY;
     return l;
}
```

-continued

```c
/* Removes the i-th element in "list" and returns it. */
GenericList *RemoveIthElement(list, i)
GenericList **list;
int i;
{
    GenericList *1 = *list;
    if (i==0) return RemoveHead(list);
    while (i > 0) {1 = 1->next; i = i - 1;}
    1->previous->next = 1->next;
    1->next->previous = 1->previous;
    return 1;
}
/* Appends list2 and the tail of list1. */
GenericList *AppendList(list1, list2)
GenericList *list1, *list2;
{
    GenericList *tail;
    if (list1 == EMPTY) return list2;
    tail = TailOfList(list1);
    list2->previous = tail;
    tail->next = list2;
    return list1;
}
/* Removes the given element from list: */
void RemoveElement(list, element)
GenericList **list, *element;
{
    GenericList *1 = *list;
    if (1 == element) {*list = EMPTY; return;}
    element->previous->next = element->next;
    element->next->previous = element->previous;
}
/* Code reference 4.4 */
/* Procedure to tell if two pixels are adjacent.
   Returns 1 if they are, 0 if not. */
int Adjacent(li1, li2)
ListInfo li1, li2;
{
    PixelElement *p1 = (PixelElement *)li1;
    PixelElement *p2 = (PixelElement *)li2;
    float xDiff, yDiff;
    xDiff = p1->x - p2->x;
    yDiff = p1->y - p2->y;
    if (xDiff >= -1 && xDiff <= 1) {
        if (yDiff < -1) return 0;
        if (yDiff > 1) return 0;
        return 1;
    }
    return 0;
}
/* Code reference 4.5 */
GenericList * ProcessOneCell(LM, LC)
GenericList *LM, *LC;
{
    GenericList *LL = EMPTY; /* Initialize LL to
                                an empty list.*/
    GenericList *finalList = EMPTY;
    GenericList *headLM, *tailLM;
    GenericList *q;
    int blackCase = 1;/* 0 means even case,
        1 means odd case. */
    int newRank = 0;
    int nTotal = CountElements(LC);

headLM = LM;
    tailLM = TailOfList(LM);
/* Code reference 4.6: mail loop*/
    while (headLM != tailLM || LC != EMPTY) {
        GenericList *p;
        GenericList *LN;
        GenericList *L;
        GenericList *newList;
        int i;
/* Code reference 4.7 */
/* Make a copy of next element in LM to examine: */
        p = NewListElement( );
        if (blackCase) {
            p = headLM->element;
            headLM = headLM->next;
        } else {
            p = tailLM->element;
            tailLM = tailLM->previous;
        }
/* Next find all list in LL that have elements adjacent to p,
   remove these list, merge them into list along with p,
   and add back into LL: */

/* Code reference 4.8 */
/* First, construct LN, a list of numbers indicating which lists
   in LL have elements adjacent to p: */
        LN = EMPTY;
        i = 0;
        for (L=LL; L != EMPTY; L = L->next) {
            for (q = (GenericList *)L->element; q != EMPTY;
                q = q->next) {
                if (Adjacent(p->element, q->element)) {
                    LN = AddToList(LN, (ListInfo) i);
                    break;   /* Leave enclosing for loop. */
                }
            }
            i = i+1;
        }
/* Code reference 4.9 */
/* Now remove and merge all lists mentioned in LN. */
        newList = EMPTY;
        for (L=LN; L!=EMPTY; L=L->next) {
            GenericList *tempList = EMPTY;
            i = (int) L->element;
            tempList = RemoveIthElement(&LL, i);
            newList = AppendList(newList, tempList);
        }
        newList = AppendList(newList, p);
        LL = AppendList(LL, newList);
/* Code reference 4.10 */
/* Now find the next element in LC according to new ranking.
   This will be the first (or last) element in LC adjacent
   to any element in newList. First or last depending on the
   even/odd case. */
        if (blackCase) {
            for (q=LC; q != EMPTY; q = q->next) {
                GenericList *r;
                for (r=newList; r != EMPTY; r = r->next) {
                    if (Adjacent(q->element, r->element)) {
                        RemoveElement(&LC, q);
                        ((PixelElement *)(q->element))->newRank = newRank;
                        finalList = AppendList(finalList, q);
                        goto LoopExit;
                    }
                }
            }
        } else {
            for (q=TailOfList(LC); q != EMPTY; q = q->previous) {
                GenericList *r;
                for (r=newList; r != EMPTY; r = r->next) {
                    if (Adjacent(q->element, r->element)) {
                        RemoveElement(&LC, q);
                        ((PixelElement *)(q->element))->newRank =
                            nTotal - newRank;
                        finalList = AppendList(finalList, q);
                        goto LoopExit;
                    }
                }
            }
        }
LoopExit:

/* Code reference 4.11 */
        if (blackCase == 0) newRank = newRank + 1;
        /* Change from black dot to white dot case: */
        blackCase = 1 - blackCase;   }
        /* End of main loop. */

/* Code reference 4.12 */
    while (LC != EMPTY) {
        q = RemoveHead(&LC);
        ((PixelElement *) q->element)->newRank = newRank;
        finalList = AppendList(finalList, q);
        newRank = newRank + 1;
    }
    return finalList;
}                            /* end of code segment 4 */
```

Once the model digital cell called M or "model cell M", is chosen, the generic pixels in the digital cell M are represented in computer program as an array of records, each record representing one generic pixel. In code segment 4, above, such a record is defined by the "PixelElement" declaration in code reference 4.2. The "x" and "y" fields of this PixelElement structure are used to store the x and y device space coordinates of the pixel being represented. Next, for each record, the x and y device coordinates stored with that record are converted into ideal cell space coordinates and are an input to the spot function. The result computed by the spot function is then stored in the record in the field named "spotValue". Next the records in the array are sorted according to the spotValue field of the array so that the first element of the array is the record whose spotValue field the is smallest, followed by the record whose spotValue field is the next smallest and so on. Such sorting techniques are well known to those skilled in the art. Next, the field "oldRank" in each PixelElement record is filled with the index of that record in the array of PixelElement records. The index is 0 for the first record in the array, 1 for the next records in the array, and so on in consecutive order. This index will be referred to as the "rank" of a generic pixel in the array. The rank of a generic pixel will be used later to determine the threshold value in the threshold array for that generic pixel, which in turn determines at what gray value the pixel turns from black to white. Taken as a whole, the ranking values for all pixels determine the distribution of black generic pixels used to form halftone dots for different gray values represented in a halftoned image.

Next, a doubly linked list is built, based on the elements in the sorted array. This doubly linked list is formed from a second type of record defined by the "GenericList" declaration of code reference 4.1, in addition to being defined by the PixelElement record discussed above. The GenericList record has fields for recording the next and previous elements in such a list, named "next" and "previous", and a field for recording the data being listed in the "element" field. The element field may be of various types. In this particular example the element field is a pointer to, or an address of a PixelElement record. Thus a doubly linked list of GenericList records is formed, each of which refers to a unique second PixelElement record. Furthermore the order of these second PixelElement records represented by this list is the same as the order of PixelElement records in the first sorted array. The technique of construction of such a double linked list will be obvious to those skilled in the art. (Reference: *Data Structures and C Programs*, by Van Wyk, chapters 3-5, incorporated herein by reference.)

The variable in code segment 4 that contains the address of the first GenericList record in the above doubly linked list is named LM. Thus this list will be referred to as list. The portion of the threshold array corresponding to digital cell M can now be filled in. For each generic pixel represented in list LM, a threshold value is computed from the oldRank field in the corresponding PixelElement record. If N is the total number of generic pixels in the digital cell M, then the threshold array value for such a pixel is Ceil(oldRank * 255/N).

The remainder of this fourth technique then proceeds to process each digital cell that is different from digital cell M in the same way, up to the step of the computation of the threshold values of the pixels. Thus the remainder of the technique is explained in reference to a selected digital cell called C (also referred to as "selected cell C"), which is different from the model digital cell M. It should be kept in mind that the following procedure must be repeated for all digital cells different from model cell M.

Next, an array of PixelElement records is constructed, sorted and ranked from the selected cell C in exactly the same way as such an array was created for the model cell M above. A doubly linked list that refers to elements in the array based on selected cell C (so that elements in the array and elements in the list are in the same order) is then constructed in exactly the same way as was done for the model cell M. The first record in this list is referred to in source code segment 4 as LC. Thereafter the doubly linked list for the selected cell C will be called list LC.

The threshold array locations corresponding to generic pixels in selected cell C are not filled in at this point, as they were for the model cell M. Before filling them in, further processing is done. The term (tx, ty) is used to denote a vector in device coordinates that, when added to the lower corner of the selected ideal cell C, translates it to the lower corner of the model ideal cell M. If the cells are parallel with device coordinates, then the lower left corner of both ideal cells are chosen. Note that tx and ty will in general not be integers.

The next step in this technique is to add tx to each x field in each PixelElement in the list LC, and to add ty to each y field in each PixelElement in the list LC. This has the effect of translating the selected cell C so that it is superimposed over the model cell M. This allows the ranking of the generic pixels in the selected cell C in a way that mimics the ranking of the generic pixels in the model cell M, which insures that dot pieces in the selected cell C will be the same shape and size as dot pieces in model cell M, when the same gray intensity is shown in both cells.

Now that lists LM and LC have been prepared as described above, the procedure named "ProcessOneCell" in Code reference 4.5 is called to do the remaining work in processing the selected cell C. The procedure ProcessOneCell, in fact, takes two arguments, LM and LC, the two lists which have just been constructed.

Before explaining how ProcessOneCell works, code reference 4.3 and 4.4 will be mentioned briefly. Note that the source code for the construction of LM and LC is not explicitly given in code segment 4 because it is accomplished by techniques that are well known in the art.

Some of source code in the listing between code reference 4.2, discussed above, and code reference 4.5 hasn't been discussed. The source code under code reference 4.3 consists of procedures for manipulating the various lists generated in the course of the technique. These are standard procedures similar to others used in prior art applications. These procedures are not claimed as part of the present invention, but they are presented in the source code listing for completeness.

The code under code reference 4.4 will be discussed below in the context of its use within the ProcessOneCell procedure, whose technique of operation will now be explained with reference to code reference 4.5.

The first part of code reference 4.5 declares various variables that will be used in the body of the procedure. In particular, the variables LL, finallist, headLM, tailLM and q are declared to be of type GenericList, which means they will be lists of various types. The variables blackCase, newRank and nTotal are declared as integers. The meanings of these variables will be explained as they are used.

In the declaration of the above variables some are initialized to certain values. For example, the list variables LL and finalList are initialize to EMPTY, which is a code used in the program to mean that their is nothing in these lists yet. The explanation in general terms of the technique of the part of the present invention implemented by the procedure ProcessOnceCell will follow. After that, the details of particular parts of the source code listing will be provided.

In the descriptions that follow, a reference will be made to "gray levels". Gray levels can be described numerically with many scales or ranges of numbers. It is convenient to use a scale that is based on the number of generic pixels in the model cell M, which is denoted nTotal. A gray level of 0 will be totally white. A gray level of nTotal will be totally black. An intermediate gray level g will correspond to the gray produced when g generic pixels out of every nTotal are black. Thus, in order to make the model digital cell M represent a gray intensity of g, all generic pixels whose rank is g or less are turned black, leaving the remainder white. This establishes a close relationship between gray levels and the rank of pixels in a digital cell, which was expressed above as the field oldRank in the PixelElement structure and will be further explained below.

The technique of the invention is to modify the ranking of the generic pixels in selected cell C so that for a given gray level, the dot pieces produced by selected cell C will be the same size and location as the dot pieces produced by model cell M. If there is only one dot piece produced in model cell M and only one dot piece produced selected cell C, for a given gray level g, then the two dot pieces will automatically be the same size and no further work need be done. However, if there is more than one dot piece produced in model cell M at a given gray level g, then the technique insures that, for the same gray level g, the dot pieces produced in cell C will be of equal size, and in approximately the same respective locations, as they were within cell M. The term "dot piece" was defined above in greater detail in the section on terminology.

In order to modify the ranking of the generic pixels in selected cell C to achieve the purpose stated above, for each gray level, the number and location of the generic pixels comprising each dot piece in model cell M must be known. To this end, the variable LL is maintained and updated for each new gray level as a list of sublists in which each sublist is a list of PixelElement structures that corresponds to all the generic pixels in a dot piece for a given gray level. Thus, for example, FIG. 1 shows that the black generic pixels in the digital cell 130A form two dot pieces, there are nine generic pixels primarily in halftone dot 70A and there is one generic pixel primarily in halftone dot 70D. In this case the list LL would consist of two lists, the first containing the nine pixels in halftone dot 70A and the second containing the single halftone dot in 70D.

A further modification should be made to the contents of the list LL in order for the technique to work at all gray levels. Where gray levels are more than 50% black, the halftoned image generally consists of white dots on a black background as opposed to black halftone dots on a white background. To make the method of the invention effective for grays that are more than 50% black, white dots and white dot pieces must be controlled in the same way that black dot pieces are controlled. To this end the list LL will be made to contain sublists describing both the black dot pieces at a given gray level g and the white dot pieces at the gray level (nTotal-g). In this way the list LL serves two functions at once.

Note that there are other techniques of this technique in which two separate lists are maintained instead of LL: one for white dot pieces and the other for black dot pieces. The present invention could easily be converted to such a scheme by those skilled in the art. Such a scheme may be superior for some spot functions.

The actual sequence of operations of this step of the technique will now be described. The main part is the main loop that considers each possible cell dot that can be formed in model cell M. The possible black cell dots will be those formed by the first n elements in the list LM, where n varies from 1 to nTotal/2. The possible white cell dots will be those formed by the last n elements of the list LM, where n varies from 1 to nTotal/2. The order in which these cell dots are considered is: first the smallest black cell dot, consisting of the first element in the list LM, is considered. Next, the smallest white cell dot, consisting of the last element in the list LM, is considered. Thereafter, the next-to-smallest black cell dot, consisting of the first two elements in the list Lm, is considered. Thereafter, the next-to-smallest white cell dot, consisting of the last two elements in the list LM is considered. This sequence continues, alternating between successively larger black and white cell dots.

Each pass through the main loop the list LL is updated to reflect the arrangement of generic pixels in the black and white cell dots currently being considered. Also, each time through the main loop a new generic pixel is removed from the list LC of generic pixels in the selected cell C, and is given a new ranking and added to a different list, called finallist in the source code. When the code execution is completed, the finallist will contain all the generic pixels in the selected cell C, each with a new ranking having the desired properties.

Generally stated, one technique of the invention uses the steps of: (a) ranking the plurality of pixels in each digital cell by sorting them according to a predetermined order to establish of that plurality of pixels a first rank; (b) ranking the pixels in each of the remaining digital cells so that a given pixel of each cell is assigned a given second rank where the number of pixels contiguous to the given pixel, whose previously assigned second rank is equal to or less than the given second rank of the given pixel, is approximately equal to the number of pixels contiguous to the analogous pixel in the first digital cell, and whose first rank is equal to or less than the given second rank of the given pixel, thereby establishing a second ranking of pixels. Next the plurality of pixels is displayed using the given second ranking to determine which pixels to display for the purpose of properly reproducing the predetermined gray levels of the image being reproduced.

The technique of selecting generic pixels from the list LC and giving them a new ranking hinges on how the list LL is updated at the head of the main loop. This method may vary when a black cell dot is being considered as opposed to a white cell dot. The case of a black cell dot will be considered first.

When a black cell dot is being considered, the first generic pixel p in the list LM, which is not in the black or white cell dots represented by the list LL, is selected. Those sublists of the list LL that contain pixels adjacent to p are then found. Here adjacent means that the two pixels either overlap or share a side. The condition of adjacency is implemented by the procedure "Adjacent" of code reference 4.4. All the sublists of LL that contain pixels adjacent to p are removed from the list LL. Then these removed lists and the pixel p itself are merged into one new list, called newList in the source code, and then put back into the list LL.

Next the first generic pixel in the list LC, called q in the source code, which is adjacent to any element in the list newList, is removed from the list LC and put into finallist. The generic pixel q in this case is given a new ranking that equals the number of times the main loop has been executed to consider a black cell dot. This ranking is calculated by initializing the variable newRank in the source code and then simply incrementing this variable every other time the loop is executed.

When considering a white dot, the technique is similar to the above except for the following. The generic pixel p is chosen to be the last generic pixel in the list LM, while is not in the set of generic pixels represented in LL (as opposed to the first). Also the generic pixel q is the last (as opposed to first) generic pixel in the list LC that is adjacent to any element of newList.

The above steps relate to sections of the above source code listing as follows: The code listing after code reference 4.7 is the main loop. Prior to this the two variables "headM" and "tailM" are initialized so that they point to the head and tail, respectively, of the list LM. Also the variable "blackCase" is set to one. When blackCase has the value one, the loop considers the next black cell dot; when blackCase has the value 0, a white cell dot is considered. The value of blackCase is switched between 0 and 1 at the end of the main loop, thus insuring that black and white cell dots are considered alternately.

At the beginning of the body of the main loop in code reference 4.7, the variable p is made to represent the same pixel as headM if blackCase is 1, and as tailM if blackCase is 0. The variable headM represents the first pixel in list LM that hasn't been added to the set of generic pixels represented by list LL. After assigning headM to p, headM is set to the next generic pixel after p so that a new generic pixel will be used the next time. A similar sequence of events occurs for tailM.

Next, code reference 4.8 generates a list of lists in LL that have elements adjacent to the generic pixel p. This becomes the variable LN. Next, in code reference 4.9, each of the lists contained in LN is removed from LL and appended to the list newList. After this, the generic pixel p is added to newList and newList is added back as a new element of list LL.

Next, in code reference 4.10, the generic pixel q is removed from list LC and added to finallist. There is an "if" statement that does this in two different ways, depending on whether blackCase equals zero or one. The differences are in the order in which the list LC is searched for the first qualifying element (front to back or back to front). The rank assigned to the removed pixel q is newRank or nTotal-newRank.

Next, in code reference 4.11, at the end of the main loop, the variables blackCase and newRank are updated for the next pass through the main loop.

Next any generic pixels in the list LC that were not processed in the main loop are processed in code reference 4.12. The main loop terminates if either the generic pixels in the list LM or the list LC are exhausted. In some cases the list LC may have more generic pixels than the list LM. Then the remaining unprocessed generic pixels in the list LC are given successive rankings starting from the current value of the variable newRank.

This completes the processing of the procedure ProcessOneCell. After this processing, the portion of the threshold array corresponding to the selected cell C is calculated from the new ranking of the pixels in finallist which is returned by ProcessOnceCell. As before, the threshold value of a generic pixel will be Ceil(newRank * 255/nTotal), where newRank is the value from the newRank field in the PixelElement structure representing the pixel.

The location of the pixel will be obtained from the x and y fields of the PixelElement structure except that the value tx must be subtracted from the x field and the value ty must be subtracted from the y field, where (tx, ty) were earlier described as the vector that translates the selected cell C to the model cell M.

The various techniques of the invention described above may be used together or separately. Certain combinations of these technique are more useful at certain ranges of angles and frequencies than others. A software program may decide which technique or combination of techniques apply to a specific task based on the imagesetter resolution, the frequency of requested halftone grid and the angle of the requested halftone grid.

The preferred technique of the invention has now been described. Various substitutions and alternatives will be apparent to persons skilled in the art from the teaching of this invention. It is therefore not intended that the invention be limited to the described embodiment, but only as defined by the appended claims.

What is claimed is:

1. A method of displaying a high quality image on a raster display device having predetermined gray levels made up of halftone dots of substantially equal shape and size in a supertile that includes K digital cells, each supertile having a geometric center of gravity, K corresponding ideal cells each having geometric centers and a plurality of pixels having coordinates to reproduce the image by applying a spot function selected from a wide range of spot functions to the coordinates of a selected list of pixels, comprising the steps of:

a) creating a list of pixels in a digital cell;
   b) determining the x and y coordinates in cell space of the pixels in the said digital cell;
   c) determining an offset vector having x and y coordinates to be applied to said pixel coordinates in cell space of that digital cell;
   d) adding said offset vector to the coordinates of said pixels in said list;
   e) selecting a spot function from a wide variety of spot functions;
   f) ranking said pixels in said list according to the value resulting from applying said selected spot function to their coordinates;
   g) selecting pixels for display according to the results of said ranking in order to properly reproduce said predetermined gray levels of the image being reproduced; and
   h) displaying a high quality image including the pixels that have been selected for display using a ranking resulting from applying a spot function selected from a wide range of spot functions.

2. The technique of claim 1 wherein the pixels are selected in rank order until the ratio of black to white pixels provides a predetermined gray level.

3. The technique of claim 1 wherein said offset vector is the difference between the geometric center of the ideal cell associated with said digital cell and the geometric center of gravity of said digital cell.

4. The technique of claim 3 wherein said center of gravity is computed by converting device coordinate values of said pixels to ideal cell space coordinates and averaging the resulting coordinate values separately to obtain the respective average coordinate values.

5. The technique of claim 1 wherein the x and y coordinates of said offset vector are determined by a random number generator.

6. The technique of claim 1 wherein said offset vector has the same value for all digital cells in said supertile, and after adding said offset vector to said coordinates of said pixels, if the total is outside a predetermined range, the sum is adjusted to lie within said predetermined range.

7. The method of claim 6 where said offset vector is ($\frac{1}{2}$, $\frac{1}{2}$) and said predetermined range is from $-1$ to $+1$.

8. The technique of claim 1 wherein said supertile further includes translation vectors that are used to translate the pixel coordinates in said digital cell that lie further away than a predetermined distance from the center of the ideal cell associated with said digital cell so that the resultant translated pixel coordinates result in pixels having a distance from said center of said ideal cell smaller than said predetermined distance.

9. The technique of claim 8 wherein said center of gravity is computed by converting said resultant translated pixel coordinates to ideal cell space coordinate values and averaging the resulting ideal cell space coordinate values to obtain the average coordinate values.

10. A method of displaying an image on a raster display device having predetermined gray levels made up of halftone dots of substantially equal shape and size in a supertile which represent predetermined gray levels of the image being displayed, said supertile including a predetermined number of digital cells of a first type in a first digital halftone grid and twice said predetermined number of digital cells of a second type in a second digital halftone grid, each of said digital cells having a plurality of pixels, comprising the steps of:
 a) assigning an equal number of pixels to each of said second type of digital cells;
 b) computing a threshold value for each pixel in each of said digital cells of said second type; and
 c) comparing said threshold values to said gray levels and on the basis of the results of that comparison, selecting the pixels for display in order to properly reproduce said predetermined gray levels of the image; and
 d) displaying the image including the pixels selected for display.

11. The technique of claim 10 wherein said second ideal halftone grid (1) is rotated by 45° relative to said first ideal halftone grid; and (2) has its corners lying at the midpoints of the sides of said first ideal halftone grid.

12. The method of claim 10 wherein the coordinates of a pixel in one of the digital cells of said second type are transformed to coordinates in the cell space of a cell of said first type.

13. The method of claim 12 where, after the transformation, the transformed coordinates of said first type are inputted to a mathematical function to compute said threshold values.

14. The technique of claim 13 where said threshold values are assigned evenly over a portion of an available range of threshold values.

15. A method of displaying an image on a raster display device having predetermined gray levels made up of halftone dots of substantially equal shape and size in a supertile that includes a predetermined number of digital cells, each digital cell having a plurality of pixels, a first of said digital cells and each remaining digital cell having a cell data structure representing pixels which allows the operations of sorting, ranking and selecting pixels of predetermined rank, comprising the steps of:
 a) selecting a spot function from a wide variety of spot functions;
 b) ranking the plurality of pixels in said first digital cell according to the value resulting from applying said selected spot function to their cell space coordinates to establish for the plurality of pixels for such cell a first rank order;
 c) ranking the plurality of pixels in the remaining digital cells in the same manner as for said first digital cell to provide a first ranking for the plurality of pixels of each said remaining digital cells;
 d) for each of said remaining digital cells, selecting one pixel from the plurality of pixels in each such cell which was assigned the lowest rank in step c), above, and assigning said one pixel, a second rank which is as low as possible;
 e) iteratively ranking the remaining pixels in each of said remaining digital cells so that a given pixel of each such remaining cell is assigned a given second rank, where the number of previously second-ranked pixels contiguous to said given pixel is approximately equal to a number of pixels in said first digital cell which are: (1) contiguous to a pixel whose first rank in said first rank order is equal to said given second rank of said given pixel; and (2) which itself has a rank less than or equal to said given second rank, thereby establishing a second ranking of pixels;
 f) selecting pixels for display according to the results of said given second ranking for the purpose of properly reproducing said predetermined gray levels of the image; and
 g) displaying the image including the pixels that have been selected for display using a ranking resulting from applying a spot function selected from a wide range of spot functions.

16. The technique of claim 15 wherein said second ranking of pixels is established consecutively starting with pixels with smaller ranks and moving to pixels with larger ranks.

17. The technique of claim 15 wherein said second ranking is established consecutively starting with pixels with larger ranks and moving to pixels with smaller ranks.

18. The technique of claim 15 wherein said second ranking is established by assigning pixel ranks alternately, one from the smallest and one from the largest available unused second ranking.

19. The technique of claim 15 wherein each pixel has coordinates in cell space and wherein said first ranking is established according to the values returned by a spot function applied to said cell space coordinates of each of said pixels.

* * * * *

UNITED STATES PATENT AND TRADEMARK OFFICE
CERTIFICATE OF CORRECTION

PATENT NO. : 5,305,118

DATED : April 19, 1994

INVENTOR(S) : Schiller et al.

It is certified that error appears in the above-indentified patent and that said Letters Patent is hereby corrected as shown below:

| | | |
|---|---|---|
| Col. 02, line 32 | delete "o;" | insert --or-- |
| Col. 08, line 26 | delete "uncoordinate" | insert --u-coordinate-- |
| Col. 11, line 56 | delete ""mode"" | insert --"model"-- |
| Col. 16, line 67 | delete "finallist" | insert --FinalList-- |
| Col. 18, line 46 | delete "of" | insert --for-- |
| Col. 19, line 14 | delete "finallist" | insert --FinalList-- |
| Col. 19, line 56 | delete "finallist" | insert --FinalList-- |
| Col. 20, line 10 | delete "finallist" | insert --FinalList-- |

Signed and Sealed this

Thirteenth Day of September, 1994

Attest:

BRUCE LEHMAN

*Attesting Officer*  *Commissioner of Patents and Trademarks*